United States Patent
Shirato

(10) Patent No.: US 11,979,253 B2
(45) Date of Patent: May 7, 2024

(54) RINGING SUPPRESSION CIRCUIT

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Hiroaki Shirato, Sagamihara Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 197 days.

(21) Appl. No.: 17/392,510

(22) Filed: Aug. 3, 2021

(65) Prior Publication Data

US 2022/0286318 A1    Sep. 8, 2022

(30) Foreign Application Priority Data

Mar. 4, 2021   (JP) .................................. 2021-034348

(51) Int. Cl.
*H04L 12/40*    (2006.01)
*H04B 3/20*    (2006.01)

(52) U.S. Cl.
CPC .............. *H04L 12/40* (2013.01); *H04B 3/20* (2013.01); *H04L 2012/40215* (2013.01); *H04L 2012/40273* (2013.01)

(58) Field of Classification Search
CPC ........... H04L 12/40; H04L 2012/40215; H04L 2012/40273; H04B 3/20

USPC ......................................................... 375/257
See application file for complete search history.

(56) References Cited

U.S. PATENT DOCUMENTS

| | | | |
|---|---|---|---|
| 2011/0158258 A1 | 6/2011 | Suzuki et al. | |
| 2017/0262394 A1 | 9/2017 | De Haas et al. | |
| 2018/0041240 A1 | 2/2018 | Tsuchiya et al. | |
| 2018/0287642 A1* | 10/2018 | Hell | H03K 5/1252 |
| 2019/0158144 A1 | 5/2019 | Honda et al. | |
| 2019/0272248 A1* | 9/2019 | Metzner | G06F 13/4022 |
| 2019/0288680 A1* | 9/2019 | Sekiya | H04L 12/40006 |

FOREIGN PATENT DOCUMENTS

| | | |
|---|---|---|
| JP | 2011135283 A | 7/2011 |
| JP | 2017-212585 A | 11/2017 |
| JP | 201822970 A | 2/2018 |
| JP | 6438983 B2 | 12/2018 |
| JP | 6555208 B2 | 8/2019 |
| JP | 202134909 A | 3/2021 |

* cited by examiner

*Primary Examiner* — Fitwi Y Hailegiorgis
(74) *Attorney, Agent, or Firm* — Maier & Maier, PLLC

(57) ABSTRACT

A ringing suppression circuit according to an embodiment includes a terminator, a switching element configured to connect the terminator between first and second bus lines, and a control signal generation circuit configured to accept a reception result of a signal from a reception circuit that receives the signal transmitted through the first and second bus lines, and generate a control signal for controlling the switching element on a basis of the reception result.

12 Claims, 4 Drawing Sheets

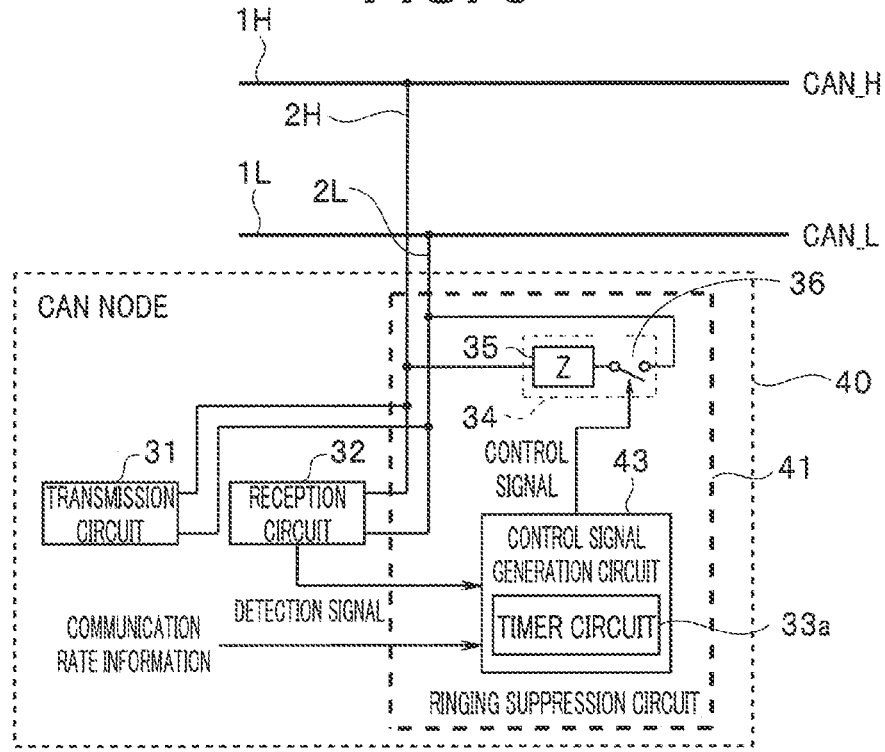
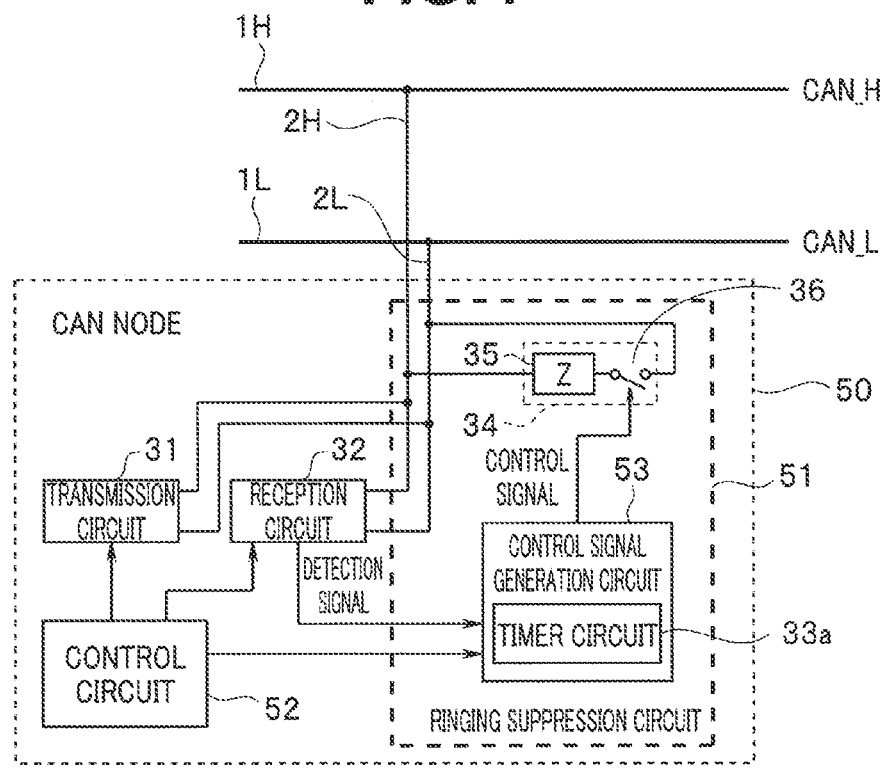

RINGING SUPPRESSION CIRCUIT

CROSS-REFERENCE TO RELATED APPLICATION

This application is based upon and claims the benefit of priority from the prior Japanese Patent Application No. 2021-34348 filed in Japan on Mar. 4, 2021; the entire contents of which are incorporated herein by reference.

FIELD

Embodiments described herein relate generally to a ringing suppression circuit.

BACKGROUND

A CAN (controller area network) has conventionally been adopted as an in-vehicle network. A CAN is a linear network that connects nodes (CAN nodes) to a bus line of a bus (CAN bus) line via branch wires. In a CAN, CAN nodes can be added easily by connecting additional branch wires to the bus line.

To improve communication quality in a CAN, a termination resistor is disposed at an end of the CAN. However, because any CAN node can be added to a CAN bus, an impedance of a transmission line is not necessarily in an ideal state, and there is a problem in that ringing may occur during signal transmission.

BRIEF DESCRIPTION OF THE DRAWINGS

FIG. 6 is a block diagram illustrating a second embodiment of the present invention; and FIG. 7 is a block diagram illustrating a third embodiment of the present invention.

DETAILED DESCRIPTION

A ringing suppression circuit according to an embodiment includes a terminator, a switching element configured to connect the terminator between first and second bus lines, and a control signal generation circuit configured to accept a reception result of a signal from a reception circuit that receives the signal transmitted through the first and second bus lines, and generate a control signal for controlling the switching element on a basis of the reception result.

Hereinafter, embodiments of the present invention will be described in detail and with reference to diagrams.

First Embodiment

Figure 1:
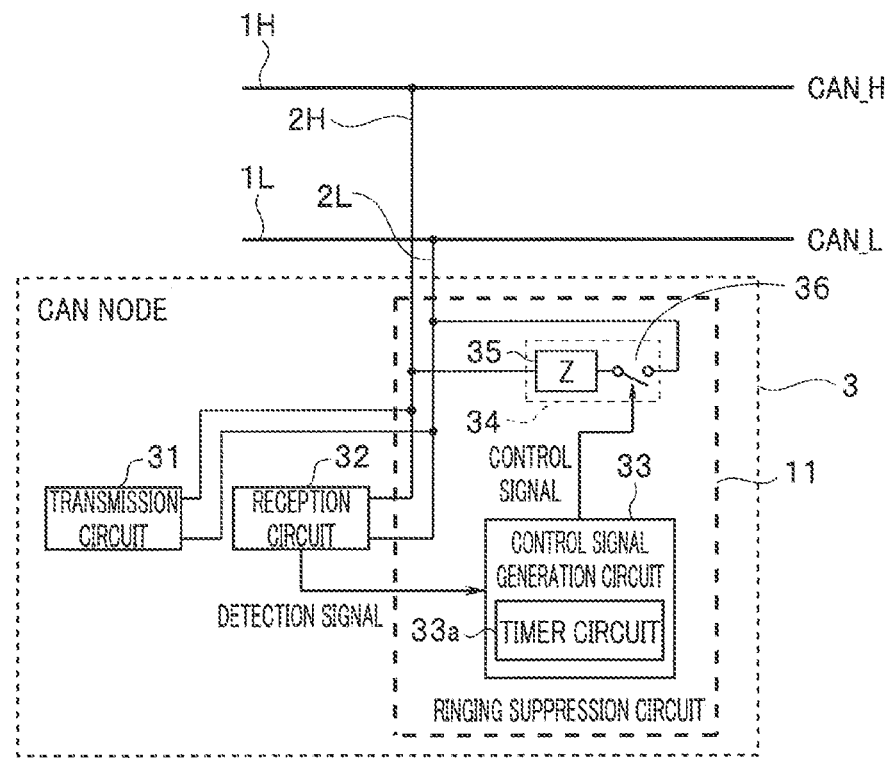
FIG. 1 is a block diagram illustrating a ringing suppression circuit according to a first embodiment of the present invention.

FIG. 1 is a block diagram illustrating a ringing suppression circuit according to a first embodiment of the present invention. In the present embodiment, an output from a reception circuit is used to detect a change from dominant to recessive, and by causing a terminator to be connectible to a bus line of a CAN bus only for a predetermined period from a detection timing, ringing can be suppressed and stable communication can be achieved.

Figure 2:
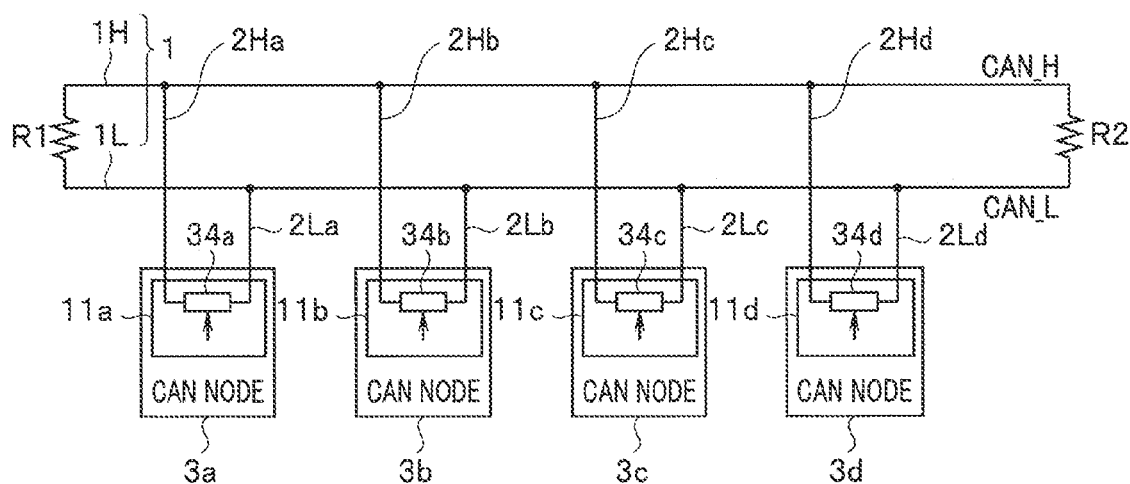
FIG. 2 is an explanatory diagram illustrating a topology of a CAN bus.
Figure 3:
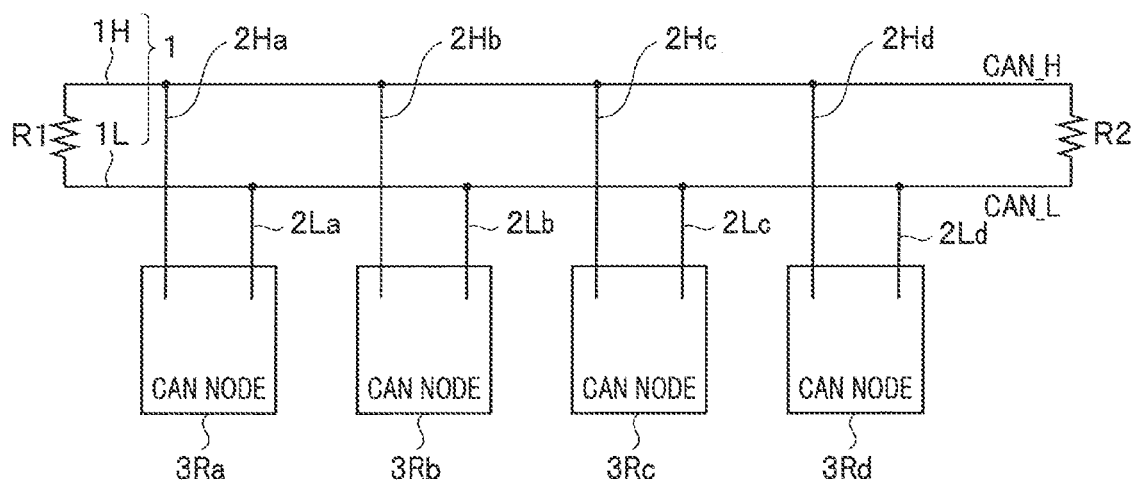
FIG. 3 is an explanatory diagram illustrating a topology of a CAN bus adopting a comparative example of CAN nodes.

FIG. 2 is an explanatory diagram illustrating a topology of a CAN bus. FIG. 1 illustrates an example of a specific configuration of a ringing suppression circuit provided with respect to one of CAN nodes in FIG. 2. Moreover, FIG. 3 is an explanatory diagram illustrating a topology of a CAN bus adopting a comparative example of CAN nodes. Note that in FIGS. 2 and 3, the same components are denoted with the same signs, and a duplicate description is omitted.

As illustrated in FIG. 2, a CAN bus 1 includes two bus lines, namely a CAN_H line 1H and a CAN_L line 1L, and transmits a differential signal through the CAN_H line 1H and the CAN_L line 1L. CAN nodes 3a to 3d are connected to the CAN bus 1 through branch wires 2Ha and 2La, branch wires 2Hb and 2Lb, branch wires 2Hc and 2Lc, and branch wires 2Hd and 2Ld, respectively. Note that the branch wires 2Ha to 2Hd will be collectively referred to as the branch wire 2H when not being distinguished individually, the branch wires 2La to 2Ld will be collectively referred to as the branch wire 2L when not being distinguished individually, and the branch wires 2Ha to 2Hd and 2La to 2Ld will be collectively referred to as the branch wire 2 when not being distinguished individually. Moreover, the CAN nodes 3a to 3d will be collectively referred to as the CAN node 3 when not being distinguished individually.

Termination resistors R1 and R2 are connected between the CAN_H line 1H and the CAN_L line 1L at one end and the other end of the CAN bus 1, respectively.

As illustrated in FIG. 1, the CAN node 3 includes a transmission circuit 31 and a reception circuit 32. The transmission circuit 31 is connected to the CAN_H line 1H through the branch wire 214 and to the CAN_L line 1L through the branch wire 2L. Similarly, the reception circuit 32 is connected to the CAN_H line 1H through the branch wire 2H and to the CAN_L line 1L through the branch wire 2L.

The transmission circuit 31 of the CAN node 3 converts data to be transmitted into transmission data conforming to the CAN protocol, and then transmits a signal by driving the branch wires 2H and 2L according to the value of each bit of the transmission data. In a case of transmitting a logical value "0" (dominant) of the transmission data, the transmission circuit 31 causes a predetermined voltage difference to occur between the CAN lines 1H and 1L, and in a case of transmitting a logical value "1" (recessive) of the transmission data, the transmission circuit 31 sets the CAN lines 1H and 1L to the same voltage.

For example, the transmission circuit 31 includes a signal path that applies an intermediate voltage to both of the CAN lines 1H and 1L through the branch wires 2H and 2L, and uses the signal path to set the CAN lines 1H and 1L to the same voltage during a recessive period. Additionally, the transmission circuit 31 includes a signal path that supplies current to the CAN_H line 1H through the branch wire 2H and subtracts current from the CAN_L line 1L through the branch wire 2L, and uses the signal path to produce a predetermined voltage between the CAN lines 1H and 1L during a dominant period.

The reception circuit 32 receives a signal transmitted through the CAN bus 1 and outputs a reception result. For example, the reception circuit 32 detects a voltage difference between the CAN lines 1H and 1L through the branch wires 2H and 2L, determines a recessive transmission period in a case where the voltage difference is a predetermined threshold value or less, and determines a dominant transmission period in a case where the voltage difference exceeds the predetermined threshold value. The reception circuit 32 outputs a signal with a level corresponding to each of the recessive period and the dominant period as the reception result.

(Ringing)

As described above, in a CAN, because any CAN node 3 can be connected to the CAN bus 1, reflections due to mismatched impedance are produced when transmitting data, and ringing occurs. By the way, the impedance of the signal path in the transmission circuit 31 that applies an intermediate voltage during a recessive period is extremely high compared to the resistance values of the termination resistors R1 and R2. Moreover, the impedance of the signal path in the transmission circuit 31 that carries current during a dominant period is relatively low and similar to the termination resistors R1 and R2. Consequently, the level of ringing is relatively low when transitioning from recessive to dominant, whereas the level of ringing is relatively high when transitioning from dominant to recessive.

Figure 4:
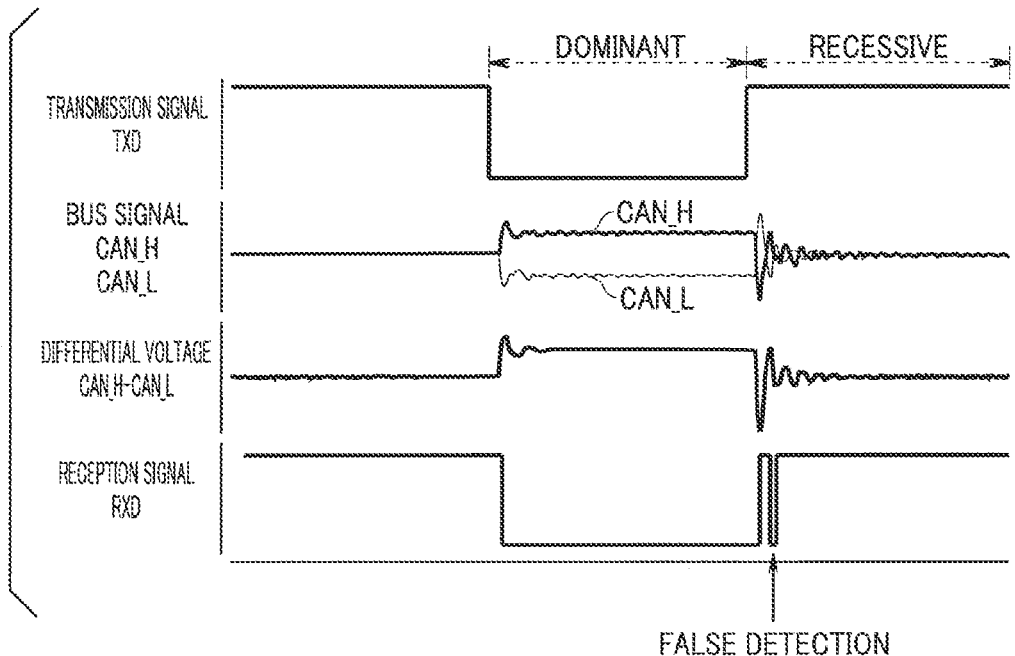
FIG. 4 is a waveform diagram for explaining an influence of ringing in a case of adopting the CAN nodes according to the comparative example illustrated in FIG. 3.

FIG. 4 is a waveform diagram for explaining the influence of ringing in a case of adopting the CAN nodes according to the comparative example illustrated in FIG. 3.

CAN nodes 3Ra to 3Rd (hereinafter collectively referred to as the CAN node 3R when not being distinguished individually) according to a comparative example illustrated in FIG. 3 have a configuration similar to the transmission circuit 31 and the reception circuit 32 in FIG. 1. Assume that a transmission signal TXD illustrated in FIG. 4 is transmitted in the transmission circuit 31 in the CAN node 3R. In other words, in this case, the transmission circuit 31 sets both the CAN lines 1H and 1L to an intermediate voltage in recessive periods, and causes a predetermined voltage difference to occur between the CAN lines 1H and 1L in dominant periods.

In other words, a bus signal CAN_H (solid line in FIG. 4) flowing through the CAN_H line 1H goes to the intermediate voltage in recessive periods and goes to a higher voltage than the intermediate voltage in dominant periods. Moreover, a bus signal CAN_L (thin line in FIG. 4) flowing through the CAN_L line 1L goes to the intermediate voltage in recessive periods and goes to a lower voltage than the intermediate voltage in dominant periods.

The reception circuit 32 in the CAN node 3R obtains the differential voltage between the voltage produced on the branch wire 2H and the voltage produced on the branch wire 2L. As illustrated in FIG. 4, the differential voltage (CAN_H-CAN_L) is 0 V in recessive periods, and a voltage level exceeding a predetermined threshold value not illustrated in dominant periods.

However, as described above, as a result of the relatively high level of ringing that occurs in the transition from dominant to recessive, the differential voltage immediately after a transition from a dominant period to a recessive period may exceed the predetermined threshold value not illustrated due to the ringing. By comparing the differential voltage to the predetermined threshold value, the reception circuit 32 of the CAN node 3R determines whether the period is a dominant period or a recessive period. In other words, in the example of FIG. 4, the reception circuit 32 of the CAN node 3R does not only detect the dominant in the dominant period, but also detects a false dominant in a recessive period immediately after a dominant period due to the influence of ringing.

Note that in the CAN bus 1, the level of ringing is relatively low in the CAN node 3R near the termination resistors R1 and R2, but the farther away the CAN node 3R is from the termination resistors R1 and R2, the higher the level of ringing becomes.

(Configuration)

Accordingly, in the present embodiment, as illustrated in FIG. 2, ringing suppression circuits 11a to 11d (hereinafter referred to as the ringing suppression circuit 11 when not being distinguished individually) for suppressing ringing on a basis of a result of detecting the transition from dominant to recessive are respectively provided in correspondence with each of the CAN nodes 3a to 3d. The ringing suppression circuits 11a to 11d have the same configuration as each other, and ringing suppressors 34a to 34d (hereinafter collectively referred to as the ringing suppressor 34 when not being distinguished individually) are provided in the ringing suppression circuits 11a to 11d. As illustrated in FIG. 1, the ringing suppression circuit 11 includes the ringing suppressor 34 and a control signal generation circuit 33 respectively configured in each CAN node 3. The ringing suppressor 34 includes a terminator (Z) 35 and a switch 36.

Note that although FIG. 2 illustrates an example in which the ringing suppression circuit 11 is respectively provided in all of the CAN nodes 3, the ringing suppression circuit 11 may be provided in a subset of one or more of the CAN nodes 3.

In the present embodiment, the ringing suppressor 34 is provided between the CAN lines 1H and 1L through the branch wires 2H and 2L. In other words, one end of the terminator 35 configuring the ringing suppressor 34 is connected to the CAN_H line 1H through the branch wire 2H. The other end of the terminator 35 is connected to one end of the switch 36, and the other end of the switch 36 is connected to the CAN_L line 1L through the branch wire 2L. The switch 36 containing a switching element turns on in a pulse period of a control signal, and turns off in other periods.

When the switch 36 turns on, the terminator 35 is electrically connected between the CAN lines 1H and 1L, and suppresses ringing occurring in signals transmitted through the CAN bus 1. For example, a resistor having a resistance value that suppresses reflections may be adopted as the terminator 35. For example, the terminator 35 may contain a resistance element having the same resistance value as the termination resistors R1 and R2. Note that although an example of configuring the ringing suppressor 34 inside the ringing suppression circuit 11 is described, the ringing suppressor 34 may also be provided for every CAN node 3 by being provided near each branch wire 2 connected to each CAN node 3.

In the present embodiment, the ringing suppression circuit 11 is configured to electrically connect the terminator 35 between the CAN lines 1H and 1L on a basis of a result of detecting the transition from dominant to recessive. In this case, in the present embodiment, by using the output of the reception circuit 32 to detect the transition from dominant to recessive, precise ringing suppression control is achievable.

The circuit portions related to communication in the CAN nodes 3 have the same configuration as each other. In FIG. 1, the reception circuit 32 obtains the differential voltage between the voltage produced on the branch wire 2H and the voltage produced on the branch wire 2L, or in other words, the voltage between the CAN lines 1H and 1L. The reception circuit 32 includes a comparator not illustrated, and by using the comparator to compare the differential voltage to a predetermined threshold value, the reception circuit 32 determines the dominant and recessive periods of a reception signal. For example, the reception circuit 32 outputs a reception result that goes to low level in dominant periods and goes to high level in recessive periods. The output (reception result) from the reception circuit 32 is supplied to a circuit block not illustrated that performs data processing inside the CAN node 3.

In the present embodiment, the output from the reception circuit 32 is also supplied to the control signal generation circuit 33. The control signal generation circuit 33 includes a timer circuit 33a. The timer circuit 33a produces time point information. The control signal generation circuit 33 detects the transition timing from a dominant period to a recessive period according to the output from the reception circuit 32, and uses the time point information from the timer circuit 33a to generate a pulse signal of predetermined width at the transition timing. The control signal generation circuit 33 outputs the generated pulse signal to the ringing suppressor 34 as a control signal. Note that the pulse width (pulse period) of the control signal is set to a width corresponding to a period in which a relatively high level of ringing occurs.

Note that the control signal generation circuit 33 may be configured by a logic circuit having a relatively simple configuration.

Figure 5:
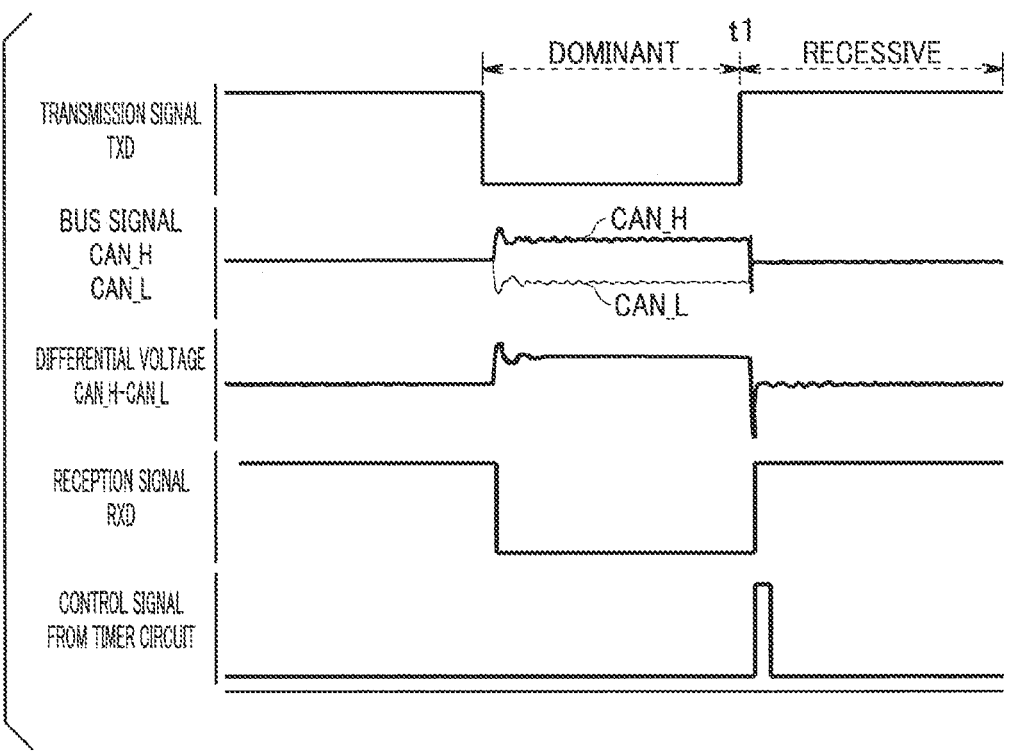
FIG. 5 is a waveform diagram for explaining ringing suppression in the first embodiment.

Next, an operation of the embodiment configured as above will be described with reference to FIG. 5. FIG. 5 is a waveform diagram for explaining ringing suppression in the first embodiment.

At this point, assume that the transmission signal TXD illustrated in FIG. 5 is transmitted from the transmission circuit 31 of a certain CAN node 3, and the transmission signal TXD is received by the reception circuit 32 of another CAN node 3. In this case, the transmission circuit 31 sets both the CAN lines 1H and 1L to an intermediate voltage in recessive periods, and causes a predetermined voltage difference to occur between the CAN lines 1H and 1L in dominant periods. The bus signal CAN_H (solid line in FIG. 5) flowing through the CAN_H line 1H goes to the intermediate voltage in recessive periods and goes to a higher voltage than the intermediate voltage in dominant periods. Moreover, the bus signal CAN_L (thin line in FIG. 5) flowing through the CAN_L line 1L goes to the intermediate voltage in recessive periods and goes to a lower voltage than the intermediate voltage in dominant periods.

The reception circuit 32 obtains the differential voltage between the voltage produced on the branch wire 2H and the voltage produced on the branch wire 2L. As illustrated in FIG. 5, the differential voltage (CAN_H-CAN_L) is 0 V in recessive periods, and a voltage level exceeding a predetermined threshold value not illustrated in dominant periods. At a timing t1 of transitioning from a dominant period to a recessive period, the differential voltage (CAN_H-CAN_L) changes from the voltage level exceeding the predetermined threshold value to a relatively low voltage level. Consequently, as illustrated in FIG. 5, at a timing t1, the output from the reception circuit 32 changes from the low level indicating dominant to the high level indicating recessive, for example.

The output from the reception circuit 32 is supplied to the control signal generation circuit 33, and the control signal generation circuit 33 produces a pulse that rises at the timing t1 when the output from the reception circuit 32 changes from the low level to the high level. The control signal generation circuit 33 sets the pulse width of the pulse signal to a predetermined pulse period based on the output from the timer circuit 33a (see FIG. 5). The control signal generation circuit 33 outputs the generated pulse to the switch 36 of the ringing suppressor 34 as a control signal.

The switch 36 is off during the low level period of the control signal. In the off period of the switch 36, the terminator 35 is not connected between the CAN lines 1H and 1L. When the control signal goes to high level, the switch 36 turns on and the terminator 35 is electrically connected between the CAN lines 1H and 1L. With this arrangement, in the on period of the switch 36, reflections are suppressed by impedance matching, and furthermore, the level of ringing decreases as a result of the ringing energy being consumed by the terminator 35. In other words, the level of ringing in the period of the pulse width of the pulse rising from the timing t1 is reduced sufficiently, and the differential voltage (CAN_H-CAN_L) in this period does not exceed the predetermined threshold value. With this arrangement, the output from the reception circuit 32 is maintained at the low level for a predetermined period from the timing t1, and the reception circuit 32 does not detect a false dominant in the recessive period. Consequently, the reception circuit 32 outputs a reception result that correctly corresponds to the dominant periods and recessive periods of the transmission signal.

In this way, in the present embodiment, the output from a reception circuit is used to detect a change from dominant to recessive, and by causing a terminator to be connectible to a bus line of a CAN bus only for a predetermined period from the detection timing, ringing can be suppressed and stable communication can be achieved. The control signal that controls the connection and disconnection of the terminator can be generated by a logic circuit with a simple circuit configuration, thereby making it possible to achieve reliable ringing control while also moderating increases in the scale of the device.

Note that although an example is described in which the terminator 35 is connected between the CAN lines 1H and 1L only in the CAN node 3 specified as a receiving destination, the terminator 35 may also be connected between the CAN lines 1H and 1L in a CAN node 3 not specified as a receiving destination.

Moreover, in the description above, the pulse width of the control signal is described as being set on a basis of time point information from the timer circuit 33a, but the pulse width may also be set using a clock based on the reception signal.

Second Embodiment

FIG. 6 is a block diagram illustrating a second embodiment of the present invention. In FIG. 6, components which are the same as FIG. 1 are denoted with the same signs, and further description is omitted. A CAN node 40 according to the present embodiment differs from the CAN node 3 according to the first embodiment by adopting a ringing suppression circuit 41 instead of the ringing suppression circuit 11. The ringing suppression circuit 41 differs from the ringing suppression circuit 11 according to the first embodiment by adopting a control signal generation circuit 43 instead of the control signal generation circuit 33. In the present embodiment, the pulse width of the control signal is changeable on a basis of communication rate information. Note that the communication rate information is information indicating the communication rate of transmission data, or in other words, the time taken to transmit 1 bit (1 bit time).

In the first embodiment, the terminator 35 is electrically connected between the CAN lines 1H and 1L immediately after the transition from dominant to recessive. In a recessive period, the CAN lines 1H and 1L are both at an intermediate voltage, and connecting the terminator 35 between the CAN lines 1H and 1L does not pose any particular problem. However, in a dominant period, a voltage difference occurs between the CAN lines 1H and 1L, and if the terminator 35 is connected between the CAN lines 1H and 1L, there is a possibility that a defect in communication may occur. For this reason, it is preferable to set the pulse width of the control signal to the shortest period after the transition from dominant to recessive until the next transition to dominant, or in other words, a duration shorter than the 1 bit time.

Communication rate information is inputted into the control signal generation circuit 43. The communication rate information may be set by a hardware electronic circuit and introduced into the control signal generation circuit 43 according to a communication rate agreed upon when configuring the CAN bus, or a signal from a processor using a CPU (central processing unit), MCU (microcontroller unit), or the like may be supplied and introduced into the control signal generation circuit 43.

Like the control signal generation circuit 33, the control signal generation circuit 43 detects the transition timing from a dominant period to a recessive period according to the output from the reception circuit 32, generates a pulse signal of predetermined width at the transition timing. In this case, the control signal generation circuit 43 is configured to generate, on a basis of communication rate information, a control signal having a pulse width of shorter time than the 1 bit time of the transmission data and also as long a pulse width as possible, or longer than the ringing period.

For example, in a case of considering a transmission rate of 5 Mbps such as CAN FD (CAN with flexible data-rate), the control signal generation circuit 43 shortens the pulse width of the control signal to less than the 1 bit time of 200 ns. Note that because there is a possibility that a ringing period will also occur over a duration of approximately 200 ns, it is preferable to set the longest possible duration without exceeding the 1 bit time as the pulse width of the control signal.

Additionally, cases where the ringing period is relatively long are also conceivable. Accordingly, to reliably suppress ringing in a case where the transmission rate is 2 Mbps or 4 Mbps, the pulse width of the control signal is set to the longest possible duration not exceeding the 1 bit time, or alternatively, to a duration not exceeding the 1 bit time and longer than the anticipated length of the ringing period.

Note that in a case where a pulse indicating the 1 bit duration with the pulse width for example is inputted as the communication rate information, it is possible to configure the control signal generation circuit 43 with a relatively simple logic circuit.

In the embodiment configured in this way, the pulse width of the control signal is set on a basis of the communication rate information. The control signal generation circuit 43 acquires the communication rate information and generates a pulse with a pulse width based on the communication rate information from the timing of the transition from a dominant period to a recessive period as the control signal. The pulse width of the control signal is shorter than the 1 bit time of the data to be transmitted. Consequently, after the transmission data has transitioned from dominant to recessive for just 1 bit, the terminator 35 is not electrically connected between the CAN lines 1H and 1L in a dominant period again, even if the transmission data transitions back to dominant. This makes it possible to suppress ringing without adversely affecting communication.

Moreover, in a case where the communication rate is relatively low, a relatively long pulse width of the control signal can be set, thereby making it possible to suppress ringing reliably even in cases where the ringing period is relatively long.

In this way, the present embodiment is capable of changing the pulse width of the control signal on a basis of the communication rate information, and therefore is capable of preventing communication defects due to the connection of the terminator.

Third Embodiment

FIG. 7 is a block diagram illustrating a third embodiment of the present invention. In FIG. 7, components which are the same as FIG. 1 are denoted with the same signs, and further description is omitted. A CAN node 50 according to the present embodiment differs from the first embodiment by adopting a ringing suppression circuit 51 instead of the ringing suppression circuit 11. The ringing suppression circuit 51 differs from the ringing suppression circuit 11 according to the first embodiment by adopting a control signal generation circuit 53 instead of the control signal generation circuit 33. The present embodiment is configured to suspend the generation of the control signal that turns on the switch 36 in a period of slow communication rate, such as in an arbitration phase.

In CAN FD described above, control is performed to slow down the communication rate relatively in an arbitration phase immediately after initiating communication, and speed up the communication rate relatively in a data phase during which data is transmitted. Because the 1 bit time is relatively long when the communication rate is low, by comparing the differential voltage (CAN_H-CAN_L) after the end of the ringing period to a predetermined threshold value, it is possible to determine dominant and recessive periods reliably.

The control signal generation circuit 53 generates a control signal according to a similar method as the control signal generation circuit 33. In the present embodiment, the control signal generation circuit 53 is configured to suspend the generation of the control signal in the arbitration phase, and generate the control signal from the data phase after arbitration.

A control circuit 52 controls each unit of the CAN node 50. The control circuit 52 may include a processor using a CPU (central processing unit), a MCU (microcontroller unit), or the like, and may control each unit by operating according to a program stored in a memory not illustrated, or achieve some or all functions in a hardware electronic circuit.

The control circuit 52 controls the transmission circuit 31 to transmit transmission data to the CAN bus 1, and also controls the reception circuit 32 to receive reception data from the CAN bus 1. The control circuit 52 is capable of analyzing the data received by the reception circuit 32 to perform arbitration in the arbitration phase. The control circuit 52 is configured to output a period signal indicating the period in which low-speed communication such as the arbitration phase is performed to the control signal generation circuit 53. The control signal generation circuit 53 uses the period signal from the control circuit 52 to set a suspension period in which the generation of the control signal is suspended.

Note that in a case where a pulse indicating the period in which low-speed communication such as the arbitration phase is performed with the pulse width for example is inputted as the period signal, it is possible to configure the control signal generation circuit 53 with a relatively simple logic circuit.

In the embodiment configured in this way, the control circuit 52 analyzes the reception data from the reception circuit 32 to thereby determine the period in which low-speed communication such as the arbitration phase is performed. The control circuit 52 outputs the period signal indicating the period in which such low-speed communication is performed to the control signal generation circuit 53.

The control signal generation circuit 53 receives the period signal from the control circuit 52. In a case where the period signal indicates a period in which low-speed communication such as the arbitration phase is being performed, the control signal generation circuit 53 suspends the generation of the control signal. If the period signal indicates that arbitration has ended and a period of relatively high-speed communication such as the data phase has been reached, the control signal generation circuit 53 generates the control signal on a basis of a detection signal from the reception circuit 32. In other words, the control signal generation circuit 53 generates the control signal that turns on the switch 36 in a predetermined period after transitioning from dominant to recessive. Consequently, ringing is suppressed and data is received reliably.

In this way, the present embodiment suspends the generation of the control signal in periods where the communication rate is relatively low, and therefore is capable of preventing communication defects due to the connection of the terminator.

Note that although the third embodiment describes an example applied to the first embodiment, the third embodiment clearly may also be applied to the second embodiment.

Moreover, by directly controlling the switch 36 according to an external control signal, the terminator 35 may be configured not to electrically connect the CAN lines 1H and 1L during the suspension period.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A ringing suppression circuit comprising:
a terminator;
a switching element configured to connect the terminator between first and second bus lines; and
a control signal generation circuit configured to accept a reception result of a signal from a reception circuit, at a time of reception of the signal transmitted through the first and second bus lines, and generate a control signal for controlling the switching element on a basis of the reception result at the time of the reception of the signal,
wherein the switching element turns on in a period shorter than one cycle of ringing to occur on the first and second bus lines after a logical value of the signal transmitted through the first and second bus lines has changed.

2. The ringing suppression circuit according to claim 1, wherein
the control signal generation circuit supplies the switching element with the control signal for connecting the terminator to the first and second bus lines for a predetermined period from a timing when a logical value of the signal changes according to the reception result.

3. The ringing suppression circuit according to claim 2, wherein
the control signal generation circuit includes a timer circuit that generates information about the predetermined period.

4. The ringing suppression circuit according to claim 3, wherein
the control signal generation circuit includes a logic circuit that generates the control signal.

5. The ringing suppression circuit according to claim 2, wherein
the timing when the logical value of the signal changes is a timing when the signal transitions from dominant to recessive.

6. The ringing suppression circuit according to claim 2, wherein
the predetermined period is shorter than a 1 bit time of the signal.

7. The ringing suppression circuit according to claim 6, wherein
the predetermined period is longer than a period in which ringing occurs.

8. The ringing suppression circuit according to claim 6, wherein
the control signal generation circuit changes the predetermined period on a basis of information related to a communication rate of the signal transmitted through the first and second bus lines.

9. The ringing suppression circuit according to claim 1, wherein
the control signal generation circuit is configured to set a suspension period in which the generation of the control signal is suspended.

10. The ringing suppression circuit according to claim 9, wherein
in a case where a communication rate of the signal transmitted through the first and second bus lines is variable between a low speed and a high speed, the control signal generation circuit sets the suspension period in a case where the communication rate is the low speed.

11. The ringing suppression circuit according to claim 1, wherein
the control signal generation circuit suspends the generation of the control signal in an arbitration phase, and generates the control signal from a data phase after arbitration.

12. The ringing suppression circuit according to claim 1, wherein
the switching element and the control signal generation circuit are provided in one or more nodes connected to the first and second bus lines.

* * * * *